United States Patent [19]

Schartz

[11] Patent Number: 5,058,958

[45] Date of Patent: Oct. 22, 1991

[54] MASK FOR RECONDITIONING THE RIMS OF AUTOMOBILE WHEELS

[76] Inventor: Rene Schartz, 5, rue de la Princesse, Breme D'Or - F-57350 Spicheren, France

[21] Appl. No.: 418,489

[22] Filed: Oct. 10, 1989

[30] Foreign Application Priority Data

Oct. 10, 1988 [FR] France ................................ 88 13289

[51] Int. Cl.[5] .......................... B60B 7/01; B05B 15/04

[52] U.S. Cl. ............................. 301/37 R; 301/37 TC; 118/505

[58] Field of Search ............... 301/37 R, 37 P, 37 ST, 301/37 TC, 37 T, 108 R, 108 A; 118/504, 505; 150/52 K

[56] References Cited

U.S. PATENT DOCUMENTS

| | | | |
|---|---|---|---|
| 2,081,666 | 5/1937 | Gunn | 91/65 |
| 2,716,391 | 8/1955 | Nonemaker et al. | 118/505 |
| 2,835,222 | 5/1958 | Hall | 118/505 |
| 3,001,509 | 9/1961 | Carpenter et al. | 118/505 |
| 3,097,410 | 7/1963 | Lincoln | 24/270 |
| 3,141,794 | 7/1964 | Horner | 118/505 |
| 3,192,896 | 7/1965 | Irving | 301/37 R |

*Primary Examiner*—Russell D. Stormer
*Attorney, Agent, or Firm*—Beveridge, DeGrandi & Weilacher

[57] ABSTRACT

Annular mask designed to be applied to the flange of an automobile wheel rim between the flange and the base of the tire to protect. The mask being made of a strong material, preferably steel sheet, in the form of a split ring shaped like the frustum of a cone with a wide apex angle, and with its two ends overlapping one another in an overlap sector. A separating device is provided for opening the mask for the pruposes of installation and removal.

11 Claims, 1 Drawing Sheet

MASK FOR RECONDITIONING THE RIMS OF AUTOMOBILE WHEELS

BACKGROUND OF THE INVENTION

The invention relates to the reconditioning of vehicle wheels, the reconditioning involving sand blasting the rim and the wheel or stripping by means of chemical pickling or a brush, followed by repainting.

The usual solution is to remove the tire from the wheel in order to carry out on the latter the operations contemplated, then to refit the tire on the wheel. A considerable waste of time and labor is thus involved in the said removal and refitting of the tire.

For painting purposes only, it would be conceivable to avoid removing the tire from the wheel by protecting it with a mask, in particular a mask of adhesive tape; however, such a mask could not withstand the sand-blasting or pickling operations. Furthermore, its positioning is a slow and delicate matter and the limits of protection are imprecise.

SUMMARY OF THE INVENTION

The object of the invention is to avoid removing the tire from the wheel and refitting it thereon by providing a mask that can be put in place quickly and easily, that perfectly matches the limit between rim and tire and, above all, is strong enough to withstand the sand blasting or stripping of the rim as well, before painting.

The invention comprises a strong material, preferably steel sheet, in the form of an annularly shaped, substantially frustoconical mask having a wide apex angle. The smaller diameter of which frustoconical mask adapts substantially to the outside diameter of the rim of the wheel to be protected. The said mask further being designed in the form of a split ring having two ends which overlap over a certain overlap sector by mutual tangential sliding of the said to permit fitting to the tolerances of the rim and gripping thereon between the end of the rim and the tire. On the said mask there is provided an opening device enabling the two ends of the split ring to be separated against the intrinsic elasticity of the ring and, if present, the bias of a tightening spring. The said device preferably comprises a lever articulated on one of the ends of the ring to push back the other end via one or more link rods articulated on the other end.

Preferably, the outer edge of the mask is incurvated or bent inwards to form a flange ensuring that particles of sand or paint are deflected inwardly.

BRIEF DESCRIPTION OF THE DRAWINGS

Other features of the invention will emerge from the following description of an exemplary embodiment that is represented on the annexed drawing, wherein.

DETAILED DESCRIPTION OF THE PREFERRED EMBODIMENT

Figure 1:
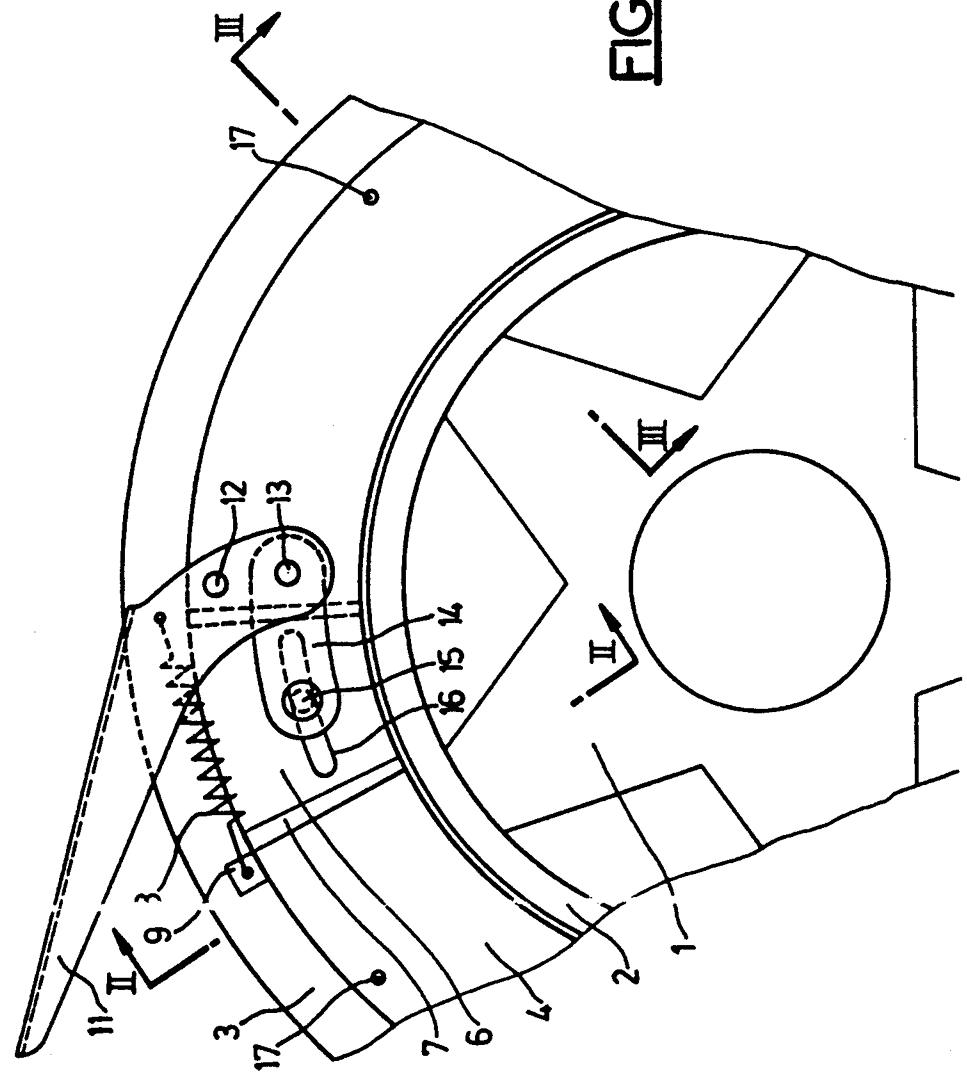
FIG. 1 is a partial front view of the device in position on a wheel.

FIG. 1 shows the wheel 1 with its rim 2, which can be indifferently a wheel of dished steel in two welded portions, or a wheel of light alloy cast in a single piece. The figure also shows the tire 3 that is mounted on the said wheel.

Figure 2:
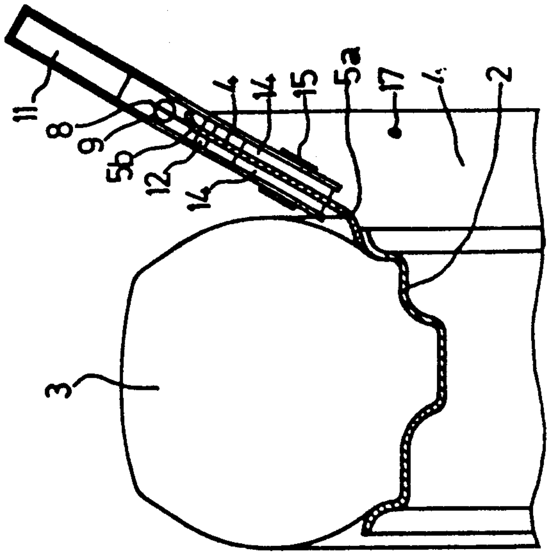
FIG. 2 is an axial partial cross-section along line II—II of FIG. 1.
Figure 3:
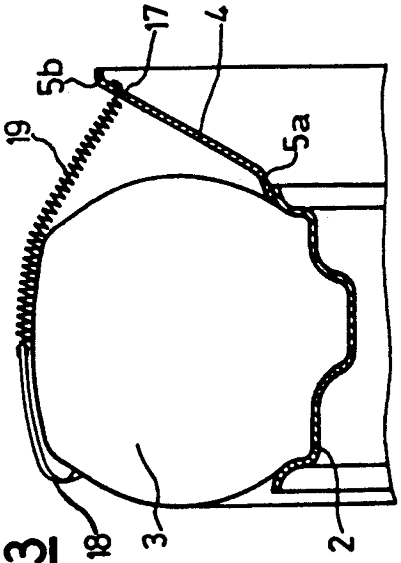
FIG. 3 is a partial cross-section along line III—III of FIG. 1.

The mask 4 according to the invention is constituted by an annular wall, of steel sheet for example, having substantially the shape of a frustum of a cone with a wide apex angle, as represented in FIGS. 2 and 3. An inner flange 5*a* is incurvated to slide in between the flange of the rim 2 and the base of the tire 3 at a smaller angle, and an outer, deflecting, flange 5*b* has a function which will become apparent below. These two incurvated or bent flanges, 5*a*, 5*b*, impart good rigidity to the mask.

The said mask 4 is designed in the form of a split ring with its two ends 6 and 7 overlapping in a sector-shaped overlap area. To ensure continuity of the two frustoconical faces and thus permit good connection, the said two ends 6 and 7 of ring 4 are preferably thinned, in their inner portions designed to engage between the rim and the tire, by up to half the thickness of the running wall of the rest of the ring.

A special mask according to the invention is provided for each wheel dimension, and its split ring design enables it to adapt to the manufacturing tolerances of the rim and to tighten onto rim. To complete this tightening effect, to supplement the elasticity proper to the split ring 4, a tension spring 8 can be stretched between the two ends 6 and 7.

To facilitate the positioning and removal of the mask which, by reason of its constituent material, its thickness and the presence of flanges 5*a* and 5*b*, has quite a considerable degree of rigidity, there is provided a device enabling the diameter of the mask to be enlarged and the mask opened by mutually separating its two ends 6 and 7 by countering the elasticity of the ring and that of the spring 8.

In the example illustrated, the said separating device can advantageously be constituted by a lever 11 articulated at 12 on the end 6 just before the overlap sector, the said lever 11 being made, for example, of sheet metal cut and folded into a U and the two arms of which are placed on either side of the wall of the mask. The other end of lever 11 comprises, on either side of mask 4, articulations 13 along the same axis for two links 14, also placed on either side of mask 4, each of these links 14 being articulated at its other end at 15 on a rivet or bolt passing through the other end 7 of the ring.

This articulation 15 can be on the outside of the overlap sector, or on the inside thereof, as represented. In the latter case, there is then provided in end 6 an oblong aperture 16 permitting the free passage of articulation 15 and ensuring that portions 6 and 7 are guided with precision, in relation to one another, in their tangential sliding movement.

It will be appreciated that spring 8 is fastened, on one hand, to a lug 9 fixed to end 7 of the mask 4 and, on the other hand, to lever 11, in such a way as to cause the latter to pivot to the lowered position.

The mask according to the invention is thus very easy to position on rim 2 of wheel 1, between the edge of the said rim and the base of tire 3 since it suffices to engage the lower inner edge of the said mask on the corresponding flange of the rim, and then to pull lever 11 upwards to cause mask 4 to open, thus enabling it to be applied against the tire. After this, lever 11 merely needs to be released for the mask as a whole to tighten firmly and automatically on the edge of the rim, whereby the incurvated flange 5*a* of the mask slides between the tire and the rim.

Additionally, holes, such as holes 17, can also be provided on mask 4 to permit the attachment of bungee cords passing behind the tire to facilitate installation and prevent any untimely disengagement, particularly in the case of large diameter wheels.

According to FIG. 3, holes 17 are used for fixing gripping means 18 fitted with springs 19 passing over the tread to fasten onto the side of the tire opposed to that protected by the mask 4.

This being the case, the wheel and its rim can easily be sand blasted or stripped using any suitable process to remove old paint and flaws, the tire remaining perfectly protected while such operations are taking place. Finally, the wheel can be painted without any splashing onto the tire, the same mask being left in place and removed only after painting.

To remove the mask, it sufficies, once agin, to pull on lever 11 in order to disengage it immediately from the wheel.

During the sand blasting and painting operations, the outer flange **5*b*** ensures that particles of sand and paint are deflected inwards and cannot, therefore, reach the tire.

It will thus be appreciated not only that is it possible to avoid the long, delicate operations involved in removing a tire from the wheel and then refitting it but also that the mask can itself be installed and removed very quickly and without any mishaps while, at the same time, ensuring a perfectly clear, leak-proof fit with the rim.

The apex angle of the frustum of the mask cone can vary according to the shape of the tire, but it is preferably greater than 90°, for example in the order of 120°. It is because of this wide apex angle that the lower flange **5*a* of the mask has to be incurvated to form at its free end an apex angle of less than 90° and preferably less than 60°. Outer flange 5*b*** is incurvated or bent in such a way as to form at its free end an apex angle of less than 45°, preferably an angle of between 0° and 30°.

I claim:

1. Annular mask for protecting a tire mounted on a rim of an automobile wheel during stripping and painting of the rim, said mask comprising:

a frustoconical split ring formed of a metal sheet material, said split ring having two ends that overlap one another in an overlap sector, said ring having an inner edge provided for engaging between a flange of the rim and the base of the tire; and an expansion device connected to said two ends of said split ring for opening said ring to permit installation and removal of said ring, said expansion device comprising a hand-actuable lever hinged on one end of said ring and connected to the other end of said ring by two links located on either side of said ring for acting upon said other end of said ring to separate said two ends against the elasticity of said ring.

2. A mask according to claim 1, wherein said two links are connected to said other end of said ring, within said overlap sector, by a hinge pin guided in an oblong opening of said one end of said ring so that said two ends of said ring are guided tangentially with respect to one another.

3. A mask according to claim 1, wherein in said overlap sector, the inner edge of said ring is thinned to one-half the thickness of the sheet material of said ring.

4. A mask according to claim 1, wherein said frustoconical ring has an apex angle greater than 90°, the inner edge of said ring being incurvated to form an inner flange having an apex angle of less than 90°.

5. A mask according to claim 4, wherein said apex angle of said ring is about 120° and said apex angle of said inner flange is less than 60°.

6. A mask according to claim 1, wherein said frustoconical ring has an apex angle greater than 90°, the outer edge of said ring being incurvated to form an outer flange having an apex angle of less than 45°.

7. A mask according to claim 6, wherein said apex angle of said ring is about 120°, and said apex angle of said outer flange is between 0° and 30°.

8. A mask according to claim 1, further comprising a tension spring stretched between said two ends of said ring.

9. A mask according to claim 1, further comprising a tension spring having two ends, a first end of said tension spring being connected to said other end of said ring and the second end of said tension spring being connected to said lever.

10. A mask according to claim 1, wherein said mask has holes at its outer edge for connection of bungee cords to said ring.

11. A mask according to claim 1, further comprising gripping means connected by springs to said ring.

* * * * *